(12) United States Patent
Sugimoto

(10) Patent No.: US 9,191,073 B2
(45) Date of Patent: Nov. 17, 2015

(54) APPLICATION SEARCH SYSTEM AND METHOD FOR EASY OPERATION

(71) Applicant: Kyocera Document Solutions Inc., Osaka (JP)

(72) Inventor: Kensaku Sugimoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/303,022

(22) Filed: Jun. 12, 2014

(65) Prior Publication Data

US 2014/0378112 A1 Dec. 25, 2014

(30) Foreign Application Priority Data

Jun. 21, 2013 (JP) ................................. 2013-130818

(51) Int. Cl.
| H04M 3/00 | (2006.01) |
| H04B 5/00 | (2006.01) |
| H04W 4/00 | (2009.01) |
| H04W 4/12 | (2009.01) |
| H04W 12/06 | (2009.01) |

(52) U.S. Cl.
CPC ............. *H04B 5/0031* (2013.01); *H04W 4/001* (2013.01); *H04W 4/008* (2013.01); *H04W 4/12* (2013.01); *H04W 12/06* (2013.01)

(58) Field of Classification Search
CPC .... H04B 5/0031; H04W 4/001; H04W 4/008; H04W 4/12; H04W 12/06
See application file for complete search history.

(56) References Cited

U.S. PATENT DOCUMENTS

| 2008/0244057 | A1* | 10/2008 | Kojima .......................... 709/223 |
| 2011/0185183 | A1* | 7/2011 | Yamamoto .................... 713/182 |
| 2013/0124349 | A1* | 5/2013 | Khan et al. ..................... 705/21 |
| 2013/0247117 | A1* | 9/2013 | Yamada et al. ................. 725/93 |

FOREIGN PATENT DOCUMENTS

JP 2006243961 9/2004

* cited by examiner

Primary Examiner — Khalid Shaheed
(74) Attorney, Agent, or Firm — K&L Gates LLP

(57) ABSTRACT

An application search system includes a mobile terminal, a device, and a server, connected to a network. The mobile terminal transmits mobile terminal OS information to the device. The device receives the mobile terminal OS information from the mobile terminal, and transmits the mobile terminal OS information and device identification information to the application management server. The server: i) receives the mobile terminal OS information and the device identification information; ii) generates, from the mobile terminal OS information and the device identification information, a list of applications installable in the mobile terminal and used for operating the device from the mobile terminal; and iii) transmits the list of applications to the device or the mobile terminal.

4 Claims, 4 Drawing Sheets

APPLICATION SEARCH SYSTEM AND METHOD FOR EASY OPERATION

REFERENCE TO RELATED APPLICATIONS

This application is based upon and claims priority to corresponding Japanese Patent Application No. 2013-130818, filed in the Japan Patent Office on Jun. 21, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an application search system and method for searching for an application to be installed in a mobile phone, a smartphone, or a mobile terminal.

BACKGROUND

It is known to enable a user to search for a desired application from an application providing site and to install the application in a mobile terminal.

When the user operates, for example, an image forming apparatus such as a multifunction peripheral (MFP), a printer, or the like, which is installed in an office of a business trip destination or a lobby of a hotel and that is usually not operated by the user, the user confirms the manufacturer and model of the image forming apparatus, searches for the application providing site of this manufacturer via the mobile terminal, and accesses the application providing site. Next, the user searches for an application installable in this model from the application providing site. Next, the user selects an application capable of executing target process in the image forming apparatus. The user operates, from among searched applications, and installs the selected application in the mobile terminal.

Since the user searches for the application providing site of the manufacturer after confirming the manufacturer and model of the image forming apparatus, it takes a lot of time and work to search for the application.

Therefore, for the mobile terminal, there has been disclosed a system where it is easy to search for an application capable of executing a process requested by the user. For example, a mobile phone is put close to an IC tag installed in a table in a restaurant and an ID is acquired. From an address management server, a uniform resource locator (URL) of a program management server from which a program (application) corresponding to the ID is able to be downloaded is acquired. Next, the mobile phone accesses the acquired URL, the program corresponding to the ID is installed in the mobile phone, and hence, it is possible to place an order with the restaurant via the user's own mobile phone.

In the above-described system, it is possible to easily install, in the mobile phone, a program where the user is able to place an order with the restaurant via the mobile phone. However, when a device such as an image forming apparatus is operated from the mobile terminal, the type of operating system (OS) of the mobile terminal, the model of the device, and also process requested by the user are different. Therefore, there are a plurality of applications for complying with these conditions. Therefore, it is difficult for the user to search for a requested application by easy operation.

SUMMARY

The present disclosure relates to an application search system and method for easy operation.

An application search system according to an embodiment of the present disclosure includes a mobile terminal, a device, and a server, connected to a network.

The mobile terminal includes a first near field communication unit configured to transmit mobile terminal OS information to the device. The device includes a second near field communication unit configured to receive the mobile terminal OS information from the mobile terminal, and a second network communication unit configured to transmit the mobile terminal OS information and device identification information to the application management server.

The server is configured to: i) receive the mobile terminal OS information and the device identification information; ii) generate, from the mobile terminal OS information and the device identification information, a list of applications installable in the mobile terminal and used for operating the device from the mobile terminal; and iii) transmit the list of applications to the device or the mobile terminal.

An application search method according to an embodiment of the present disclosure by a mobile terminal, a device, and a server, connected to a network, includes: via the mobile terminal, transmitting mobile terminal OS information to the device; via the device, receiving the mobile terminal OS information from the mobile terminal, and transmitting the mobile terminal OS information and device identification information to the server; and via the application management server, receiving the mobile terminal OS information and the device identification information, generating, from the mobile terminal OS information and the device identification information, a list of applications installable in the mobile terminal and used for operating the device from the mobile terminal, and transmitting the list of applications to the device or the mobile terminal.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

In an embodiment, if a user puts a mobile terminal close to an image forming apparatus, an IP address (hereinafter, referred to as a "URL") of a Web site of the image forming apparatus (hereinafter, referred to as a "Web site") is transmitted from the image forming apparatus to the mobile terminal, and the mobile terminal displays the first Web page of the Web site by accessing the URL. The Web site displays, in the mobile terminal, a Web page that displays an operation state of the image forming apparatus, network printing, mail transmission, changing of a network configuration, and so forth. In addition, pieces of information such as the OS type, the OS version, and so forth of the mobile terminal (hereinafter, referred to as "mobile terminal OS information") are transmitted from the mobile terminal to the image forming apparatus. The image forming apparatus transmits, to an application information management server, the mobile terminal OS information, and pieces of information such as the manufacturer and model of the image forming apparatus (hereinafter, referred to as "image forming apparatus identification information"). When receiving the mobile terminal OS information and the image forming apparatus identification information, the application information management server generates a list of applications installable in the mobile terminal and used for operating the image forming apparatus from the mobile terminal, and transmits the list of applications to the image forming apparatus. When receiving the list of applications, the image forming apparatus generates and transmits an application list Web page, to the mobile terminal. The mobile terminal switches the currently displayed first Web page of the Web site to the application list Web page. If the user selects an application from the application list Web page, the application is downloaded and installed in the mobile terminal.

Figure 1:
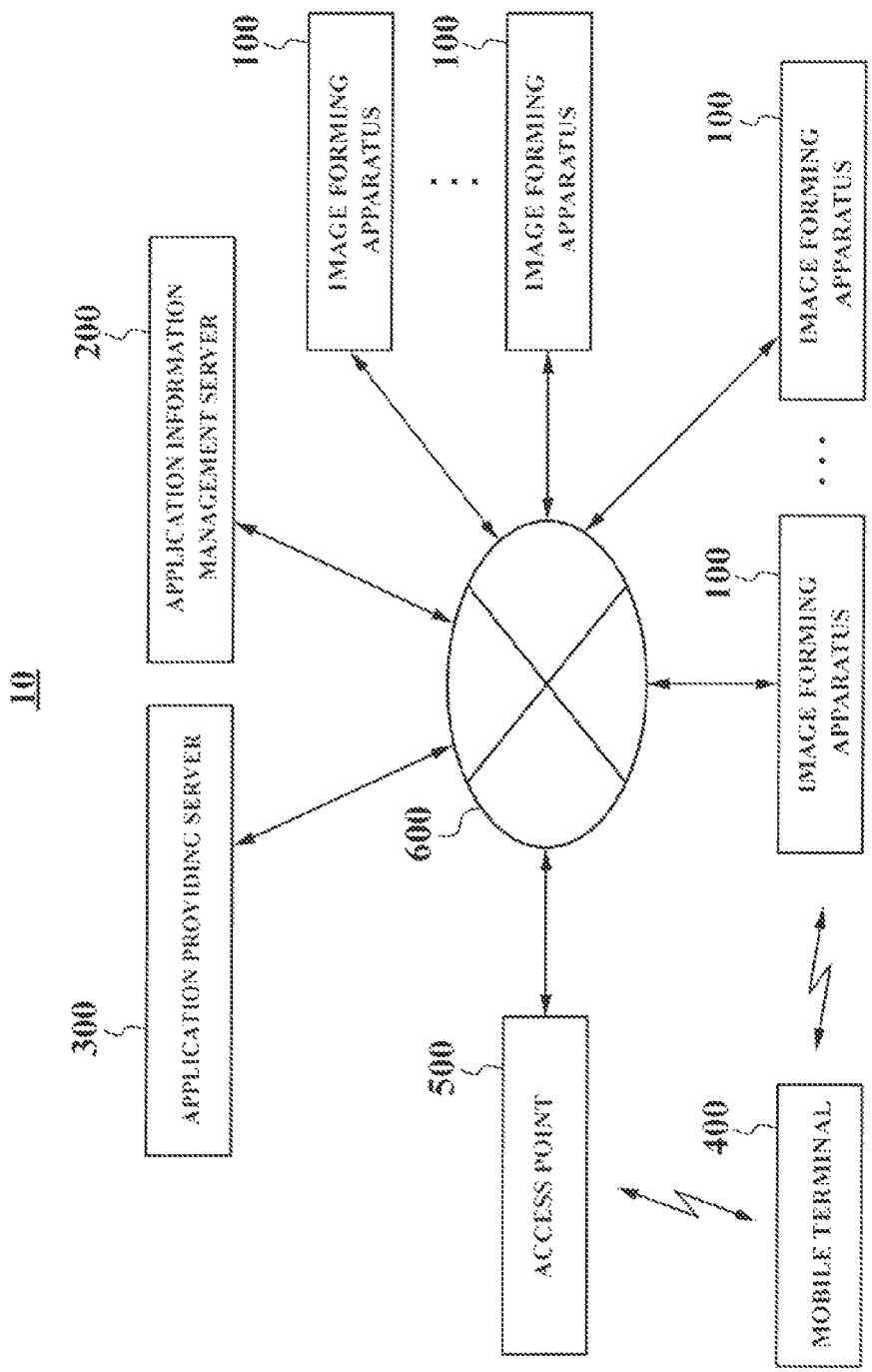
FIG. 1 is a schematic diagram illustrating a configuration of an application search system according to an embodiment of the present disclosure.

An application search system according to an embodiment of the present disclosure will be described using FIG. 1. An application search system 10 illustrated in FIG. 1 includes an image forming apparatus 100, an application information management server 200, an application providing server 300, a mobile terminal 400, an access point 500, and a network 600.

The image forming apparatus 100 is a printer, an MFP, and so forth, and includes a near field communication ("NFC") function. The image forming apparatus 100 is connect to the mobile terminal 400, using near field communication. The image forming apparatus 100 generates an application list Web page 700 installable in the mobile terminal 400, and transmits it to the mobile terminal 400. Details of the application list Web page 700 will be described later.

The application information management server 200 manages the information of an application installable in the mobile terminal 400. The application information management server 200 generates, based on the mobile terminal OS information and the image forming apparatus identification information, a list of applications installable in the mobile terminal 400 and used for operating the image forming apparatus 100 from the mobile terminal 400. The application information management server 200 transmits the list of applications to the image forming apparatus 100.

The application providing server 300 includes therein applications, and distributes a requested application to the mobile terminal 400, after receiving a distribution request from the mobile terminal 400.

The mobile terminal 400 is equipped with the near field communication function. By connecting to the image forming apparatus 100 using the near field communication, the mobile terminal 400 receives the URL of the Web site. In addition, if the mobile terminal 400 receives the application list Web page 700 from the image forming apparatus 100 when accessing the Web site of the URL and displaying the first Web page, the first Web page is switched to the application list Web page 700. In addition, since it is possible to connect to the network 600 via the access point 500, the mobile terminal 400 is able to access the image forming apparatus 100 and the application providing server 300, connected to the network 600.

The access point 500 is a relay device used by the mobile terminal 400 for connecting to the network 600 via a provider.

The network 600 is, for example, an IP network such as the Internet or an intranet, and is connected to the image forming apparatus 100, the application information management server 200, the application providing server 300, and the access point 500.

Figure 2:
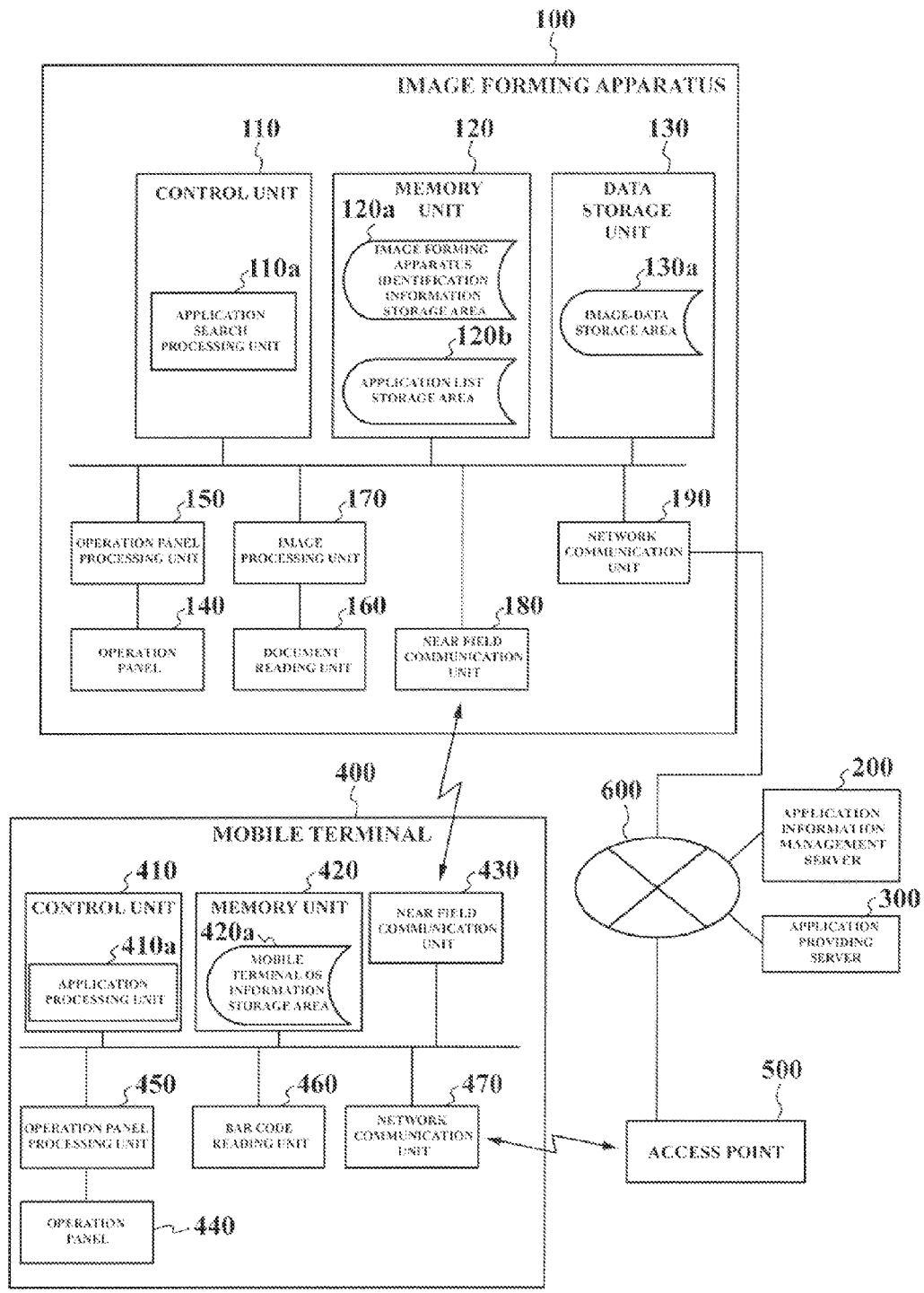
FIG. 2 is a schematic diagram illustrating functional block configurations of an image forming apparatus and a mobile terminal in the application search system illustrated in FIG. 1.

Next, the functional configuration of the image forming apparatus 100 will be described using FIG. 2. The image forming apparatus 100 illustrated in FIG. 2 includes a control unit 110, a memory unit 120, a data storage unit 130, an operation panel 140, an operation panel processing unit 150, a document reading unit 160, an image processing unit 170, a near field communication unit 180, and a network communication unit 190, and adopts a configuration where these individual units are connected using a bus or the like. An application search processing unit 110a is provided in the control unit 110. An image forming apparatus identification information storage area 120a and an application list storage area 120b are provided in the memory unit 120. An image data storage area 130a is provided in the data storage unit 130.

The control unit 110 includes a main storage device such as a RAM or a ROM, and a control device such as a central processing unit (CPU). In addition, the control unit 110 performs overall control of the image forming apparatus 100, such as control of various types of I/O, an interface such as a universal serial bus (USB), a bus controller, and so forth.

When transmitting the mobile terminal OS information received from the mobile terminal 400 and the image forming apparatus identification information to the application information management server 200, the application search processing unit 110a receives, from the application information management server 200, a list of applications installable in the mobile terminal 400 and used for operating the image forming apparatus 100 from the mobile terminal 400. In addition, the application search processing unit 110a generates the application list Web page 700 from the list of applications, and transmits the application list Web page 700 to the mobile terminal 400.

The memory unit 120 is an auxiliary storage device including a flash memory or the like, and includes therein a program and data for the process to be executed by the control unit 110.

In the image forming apparatus identification information storage area 120a, pieces of data such as the manufacturer, the model, and so forth of the image forming apparatus 100, used for identifying the image forming apparatus 100, are preliminarily included.

In the application list storage area 120b, data of the list of applications received from the application information management server 200 is temporarily included.

The data storage unit 130 is a hard disk drive that stores therein data and programs.

In the image data storage area 130a, data of an image read from the document reading unit 160 and an image received from the mobile terminal 400 via the network communication unit 190 is included.

The operation panel 140 displays an operation screen and receives an operation performed by the user. The operation panel processing unit 150 performs the process for displaying, in the operation panel 140, operation items corresponding to functions with which the image forming apparatus 100 is equipped, the process for inputting an operation of the user from the operation panel 140, and so forth.

If the user performs a read operation from the operation panel 140, the document reading unit 160 reads a document set in a platen of the image forming apparatus 100, converts the document into an image, and outputs the image to the image processing unit 170. When inputting an image from the document reading unit 160, the image processing unit 170 converts the image into data of a printable picture image or an image transmittable by a FAX or a mail, and outputs the data to the control unit 110.

The near field communication unit 180 performs wireless communication with the mobile terminal 400 at a short distance using Bluetooth (registered trademark) serving as a near field communication standard or infrared communication.

The network communication unit 190 includes an attachable and detachable LAN interface, and connects to the network 600. The LAN interface includes a network unit performing intelligent transmission/reception based on various kinds of network protocols such as TCP/IP, AppleTalk, SMB, and so forth.

Next, the functional configuration of the mobile terminal 400 will be described using FIG. 2. The mobile terminal 400 illustrated in FIG. 2 includes a control unit 410, a memory unit 420, a near field communication unit 430, an operation panel 440, an operation panel processing unit 450, a bar code reading unit 460, and a network communication unit 470, and adopts a configuration where these individual units are connected using a bus or the like. In the memory unit 420, a mobile terminal OS information storage area 420a is provided. In the control unit 410, an application processing unit 410a is provided.

The control unit 410 includes a main storage device such as a RAM or a ROM, and a control device such as a central processing unit (CPU). In addition, the control unit 410 performs the overall control of the mobile terminal 400, such as control of various types of I/O, an interface such as a universal serial bus (USB), a bus controller, and so forth. In addition, the control unit 410 includes a Web browser, and controls display of the Web page of the Web site and an operation from the Web page.

The application processing unit 410a searches for an application used for operating the image forming apparatus 100 from the mobile terminal 400, and installs the application.

The memory unit 420 is an auxiliary storage device including a flash memory or the like, and includes therein programs and data for process to be executed by the control unit 410.

In the mobile terminal OS information storage area 420a, the OS information of the mobile terminal 400 is included.

The near field communication unit 430 performs wireless communication with the image forming apparatus 100 at a short distance using Bluetooth (registered trademark) serving as the near field communication standard or infrared communication.

The operation panel 440 displays an operation screen and receives an operation performed by the user. The operation panel processing unit 450 performs the process for displaying, in the operation panel 440, operation items corresponding to functions with which the mobile terminal 400 is equipped, process for inputting an operation of the user from the operation panel 440, and process for displaying the Web page of the Web site.

The bar code reading unit 460 acquires the URL of a Web site corresponding to a two-dimensional bar code by reading the two-dimensional bar code.

The network communication unit 470 connects to the network 600 via the access point 500.

Figure 3:
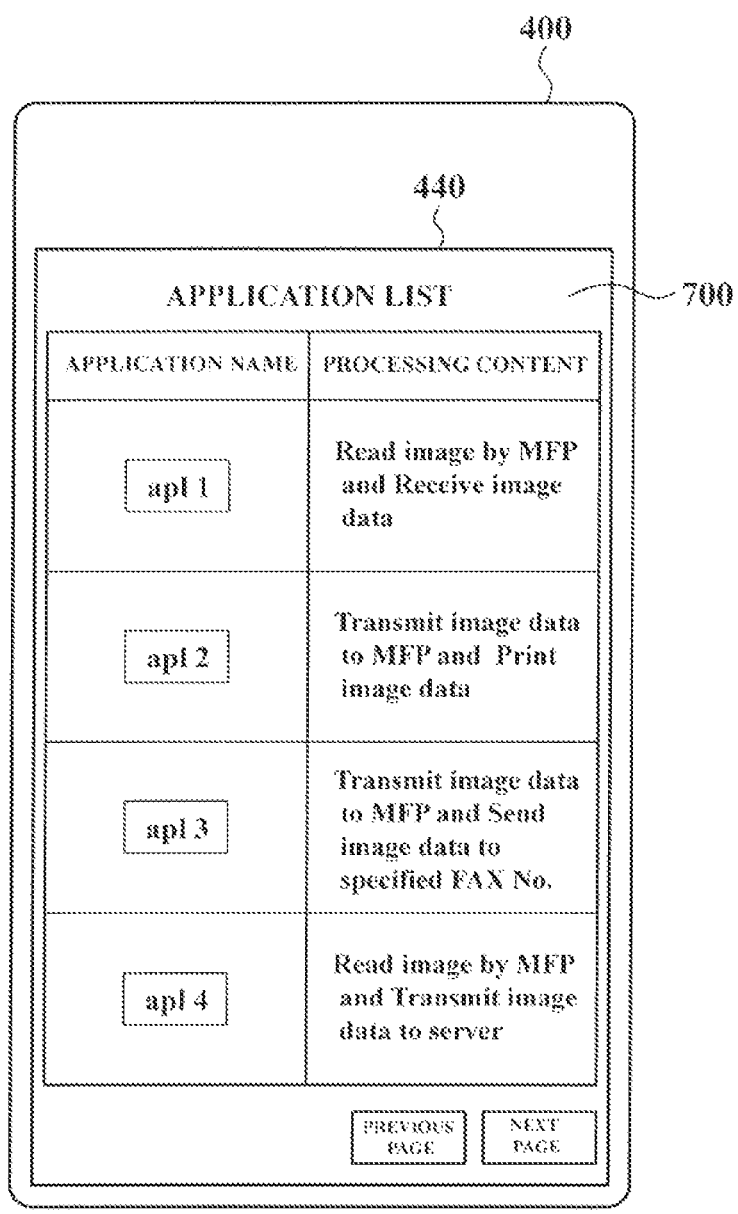
FIG. 3 is a schematic diagram illustrating an example of an application list Web page according to an embodiment of the present disclosure.

Next, the application list Web page 700 will be described using FIG. 3. As illustrated in FIG. 3, the application list Web page 700 is a page for displaying, in the operation panel 440 of the mobile terminal 400, the list of applications received from the application information management server 200 and the information thereof. This application list Web page 700 is a page displayed by accessing the Web site. In the application list Web page 700, items, "APPLICATION NAME", "PROCESSING CONTENT" of an application corresponding to "APPLICATION NAME", "PREVIOUS PAGE", and "NEXT PAGE" are provided.

In "APPLICATION NAME", a name assigned for identifying the application is displayed. In addition, if the user points to "APPLICATION NAME" when the application list Web page 700 is displayed in the operation panel 440 of the mobile terminal 400, switching to a download page of the application corresponding to "APPLICATION NAME" is performed. If the user starts installing the application from the download page, the application is distributed from the application providing server 300 to the mobile terminal 400 via the network 600.

In "PROCESSING CONTENT", the content of processing to be executed by the application is simply described.

If "PREVIOUS PAGE" is pointed to, a previous list of applications is displayed in a case where the list of applications exists prior to a currently displayed page.

If "NEXT PAGE" is pointed to, a subsequent list of applications is displayed in a case where the list of applications exists after the currently displayed page.

Figure 4:
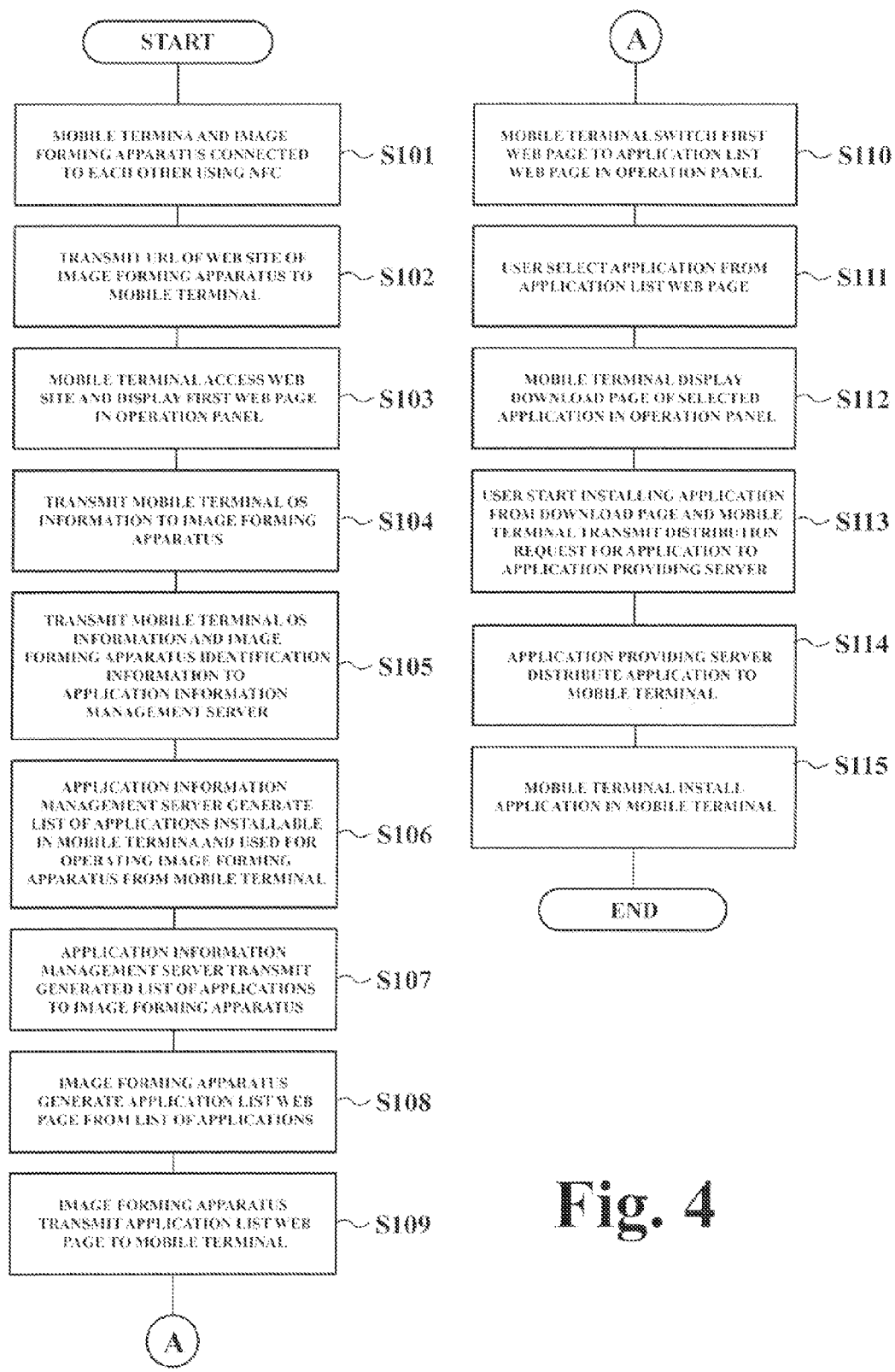
FIG. 4 is a flowchart of a procedure for searching for an application according to an embodiment of the present disclosure and installing the application in the mobile terminal.

Next, a procedure for searching for an application and installing the application in the mobile terminal 400 will be described using FIG. 4. Hereinafter, an explanation will be made in order of steps illustrated in FIG. 4.

In step S101, if the user puts the mobile terminal 400 close to the image forming apparatus 100, the mobile terminal 400 and the image forming apparatus 100 are connected to each other using the near field communication.

In step S102, the application search processing unit 110a in the image forming apparatus 100 transmits the URL of the Web site of the image forming apparatus 100 to the mobile terminal 400 using the near field communication.

In step S103, when receiving the URL of the Web site, the application processing unit 410a in the mobile terminal 400 accesses the Web site and displays the first Web page in the operation panel 440.

In step S104, the application processing unit 410a in the mobile terminal 400 extracts the mobile terminal OS information from the mobile terminal OS information storage area 420a in the memory unit 420, and transmits the mobile terminal OS information to the image forming apparatus 100.

In step S105, when receiving the mobile terminal OS information, the application search processing unit 110a in the image forming apparatus 100 extracts the image forming apparatus identification information from the image forming apparatus identification information storage area 120a, and transmits the mobile terminal OS information and the image forming apparatus identification information to the application information management server 200.

In step S106, based on the mobile terminal OS information and the image forming apparatus identification information, received from the image forming apparatus 100, the application information management server 200 generates a list of applications installable in the mobile terminal 400 and used for operating the image forming apparatus 100 from the mobile terminal 400.

In step S107, the application information management server 200 transmits the generated list of applications to the image forming apparatus 100.

In step S108, when receiving the list of applications from the application information management server 200, the image forming apparatus 100 generates the application list Web page 700 from the list of applications.

In step S109, the image forming apparatus 100 transmits the application list Web page 700 to the mobile terminal 400.

In step S110, when receiving the application list Web page 700, the application processing unit 410a in the mobile terminal 400 switches the first Web page of the image forming apparatus 100, displayed in the operation panel 440 in the step S103, to the application list Web page 700.

In step S111, the user selects an application from the application list Web page 700 by pointing to requested "APPLICATION NAME".

In step S112, the application processing unit 410a in the mobile terminal 400 displays the download page of the selected application, in the operation panel 440.

In step S113, when the user starts installing the application from the download page, the application processing unit 410a in the mobile terminal 400 transmits a distribution request for the application to the application providing server 300 via the network 600.

In step S114, when receiving the distribution request for the application, the application providing server 300 distributes the application to the mobile terminal 400 via the network 600.

In step S115, when receiving the application from the application providing server 300, the application processing unit 410a in the mobile terminal 400 installs the application in the mobile terminal 400.

Accordingly, when a list of applications installable in the mobile terminal and used for operating the image forming apparatus 100 from the mobile terminal 400 is searched for and installed, the user puts the mobile terminal 400 close to the image forming apparatus 100, and hence, it is possible to display the application list Web page 700 in the mobile terminal 400. It is possible for the user to select an application from the displayed application list Web page 700 and install the application in the mobile terminal 400.

When a device is operated from a mobile terminal, such an application search system of the present disclosure may search for an application corresponding to the mobile terminal and the device, and easily install, in the mobile terminal, an application selected from a list of searched applications.

While various aspects and embodiments have been disclosed herein, other aspects and embodiments are possible. Other designs may be used in which the above-described components are each present.

While, in the application search system 10 of the above-described embodiment, by putting the mobile terminal 400 close to the image forming apparatus 100, the URL of the Web site is transmitted to the mobile terminal 400, the URL of the Web site is not limited to the information transmitted to the mobile terminal 400. The mobile terminal 400 reads, for example, the two-dimensional bar code of the image forming apparatus 100, and hence, the URL of a Web site corresponding to the two-dimensional bar code may be acquired. In this case, the two-dimensional bar code is attached to the main body of the image forming apparatus 100, or the two-dimensional bar code is displayed in the operation panel 140 of the image forming apparatus 100. When the URL of the Web site is acquired from the two-dimensional bar code, transmission of the mobile terminal OS information from the mobile terminal 400 to the image forming apparatus 100 and/or transmission of an application list screen from the image forming apparatus 100 to the mobile terminal 400 may be performed via the network 600 without using the near field communication.

In addition, while the application search system 10 adopts the configuration including two servers of the application information management server 200 and the application providing server 300, the application search system 10 is not limited to this. For example, one application management server equipped with the functions of the application information management server 200 and the application providing server 300 may be adopted.

In addition, while the mobile terminal 400 displays the application list Web page 700 by accessing the URL of the Web site received from the image forming apparatus 100, the mobile terminal 400 is not limited to this. For example, the mobile terminal 400 may directly receive the list of applications from the application information management server 200 and display the list of applications, without acquiring the URL of the Web site from the image forming apparatus 100.

In addition, while, in the above-described embodiment, a procedure for searching for an application installable in the mobile terminal 400 and used for operating the image forming apparatus 100 from the mobile terminal 400 and installing the application has been described, an apparatus to be operated is not limited to the image forming apparatus 100. It is possible to search for, for example, an application installable in the mobile terminal 400 and used for operating various types of device and install the application.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An application search system comprising:
a mobile terminal, an image forming apparatus, and a server, connected to a network,
the mobile terminal including:
an operation panel;
a first near field communication unit that transmits mobile terminal operating system (OS) information that includes an OS type and an OS version and is stored in the mobile terminal to the image forming apparatus; and
a first network communication unit that connects to the network;
the image forming apparatus including:
a second near field communication unit that receives the mobile terminal OS information from the mobile terminal; and
a second network communication unit that transmits the mobile terminal OS information and image forming apparatus identification information that includes a manufacturer and a model of the image forming apparatus and is stored in the image forming apparatus to the server, wherein, if a user puts the mobile terminal close to the image forming apparatus, the mobile terminal and the image forming apparatus are connected to each other via the first near field communication unit and the second near field communication unit, wherein, when being connected to the mobile terminal, the image forming apparatus transmits an URL of a website of the image forming apparatus to the mobile terminal via the second near field communication unit, wherein, when receiving the URL of the website, the mobile terminal accesses the website and displays a webpage in the operation panel, wherein the server i) receives from the image forming apparatus the mobile terminal OS information and the image forming apparatus identification information, ii) generates, from the mobile terminal OS information and the image forming apparatus identification information, a list of applications that are installable in the mobile terminal and used for operating the image forming apparatus by the mobile terminal, and iii) transmits the list of applications to the image forming apparatus, wherein, when receiving the list of applications from the server, the image forming apparatus generates an application list webpage from the list of applications, and transmits the application list webpage to the mobile terminal, wherein, when receiving the application list webpage, the mobile terminal switches the webpage of the image forming apparatus displayed in the operation panel to the application list webpage, displays a download page of a selected application by the user in the operation panel, and transmits a distribution request for the selected application to the server via the first network communication unit, and wherein, when receiving the distribution request for the selected application, the server distributes the selected application to the first network communication unit in the mobile terminal.

2. The application search system according to claim 1, wherein
the mobile terminal includes a bar code reading unit, and acquires the URL of the website of the image forming apparatus by reading, using the bar code reading unit, a bar code of the image forming apparatus that is one of i) attached to a main body of the image forming apparatus and ii) displayed in an operation panel of the image forming apparatus.

3. An application search method by a mobile terminal, an image forming apparatus, and a server, connected to a network, comprising:

placing the mobile terminal close to the image forming apparatus;

connecting, via the mobile terminal, with the image forming apparatus via a near field communication;

transmitting, via the image forming apparatus, an URL of a website of the image forming apparatus to the mobile terminal via the near field communication;

accessing, via the mobile terminal, the website and displaying a webpage in an operation panel of the mobile terminal, when receiving the URL of the website;

transmitting, via the mobile terminal, mobile terminal operating system (OS) information that includes an OS type and an OS version and is stored in the mobile terminal to the image forming apparatus;

receiving, via the image forming apparatus, the mobile terminal OS information from the mobile terminal;

transmitting, via the image forming apparatus, the mobile terminal OS information and image forming apparatus identification information that includes a manufacturer and a model of the image forming apparatus and is stored in the image forming apparatus to the server;

receiving, via the server, the mobile terminal OS information and the image forming apparatus identification information;

generating, via the server, from the mobile terminal OS information and the image forming apparatus identification information, a list of applications that are installable in the mobile terminal and used for operating the image forming apparatus by the mobile terminal;

transmitting the list of applications to the image forming apparatus;

generating, via the image forming apparatus, an application list webpage from the list of applications, and transmitting the application list webpage to the mobile terminal;

switching, via the mobile terminal, the webpage of the image forming apparatus displayed in the operation panel of the mobile terminal to the application list webpage, and displaying a download page of a selected application by the user in the operation panel;

transmitting, via the mobile terminal, a distribution request for the selected application to the server using the network; and distributing, via the server, the selected application to the mobile terminal using the network.

4. The application search method according to claim 3, further comprising:
acquiring, via the mobile terminal, the URL of the website of the image forming apparatus by reading a bar code of the image forming apparatus that is one of i) attached to a main body of the image forming apparatus and ii) displayed in an operation panel of the image forming apparatus.

* * * * *